United States Patent [19]

Brennan

[11] Patent Number: 4,585,130
[45] Date of Patent: Apr. 29, 1986

[54] U-CHANNEL STORAGE SYSTEM

[76] Inventor: Mark S. Brennan, P.O. Box 70562, Pasadena, Calif. 91107

[21] Appl. No.: 649,520

[22] Filed: Sep. 11, 1984

[51] Int. Cl.$^4$ ............................................. A47B 47/00
[52] U.S. Cl. .................................... 211/190; 211/208; 242/129.6; 280/47.28
[58] Field of Search ............... 211/190, 189, 191, 206, 211/208; 242/55.3, 129.6, 129.62; 280/47.24, 47.26, 47.28

[56] References Cited

U.S. PATENT DOCUMENTS

| | | | |
|---|---|---|---|
| 1,289,002 | 12/1918 | Robinson | 242/55.3 |
| 1,959,778 | 5/1934 | Christensen | 242/55.3 |
| 2,299,736 | 10/1942 | Cavoto | 242/55.3 |
| 2,442,934 | 6/1948 | Pequet | 242/55.3 |
| 2,450,496 | 10/1948 | Whiteley | 242/55.3 X |
| 2,993,658 | 7/1961 | Sweeney | 242/55.3 |
| 3,061,218 | 10/1962 | Moore | 242/55.3 |
| 3,383,071 | 5/1968 | Godson | 242/129.6 |
| 3,856,230 | 12/1974 | Zimmer | 242/86.5 R |
| 3,937,413 | 2/1976 | Devine | 242/86.5 R |
| 3,937,414 | 2/1976 | Bank et al. | 280/47.19 X |
| 4,360,211 | 11/1982 | Blake | 211/189 X |
| 4,391,422 | 7/1983 | McDonald | 242/86.5 R X |
| 4,457,527 | 7/1984 | Lowery | 242/86.5 R X |

FOREIGN PATENT DOCUMENTS 988890  5/1976  Canada ............................ 242/129.6

Primary Examiner—Robert W. Gibson, Jr.
Assistant Examiner—Blair M. Johnson
Attorney, Agent, or Firm—J. L. Jones, Sr.

[57] ABSTRACT

To form a U-channel storage system, a pair of U-shaped metal channels are disposed and secured a selected parallel distance apart, having paired equal lengths. The paired channels secured with their channel bases turned outwardly opposed, are secured to a flat wall surface, a conventional hand operated upright dolly, a tradesman's utility truck, or the like support means. Multiple open slots are formed in the opposed juxtal channel leg positions in the channel bases, spaced a selected distance apart. Multiple paired supporting stops are secured inside and across the U-shaped channels another selected uniform distance below each slot, providing a paired holding and supporting stop for a rod member of the required length inserted in each juxtal opposed pair of slots. Reels of wire, rolls of electrical conduit, tool boxes, wire caddies having suitable selected length of caddy feet, and other tool and instrumentation devices can be arranged on and held by rod members on the pair of securing U-channels. A selected specified distance between two pair of opposed slot (four slots) can provide means for storing a wire caddy, a tool box, or instruments.

4 Claims, 7 Drawing Figures

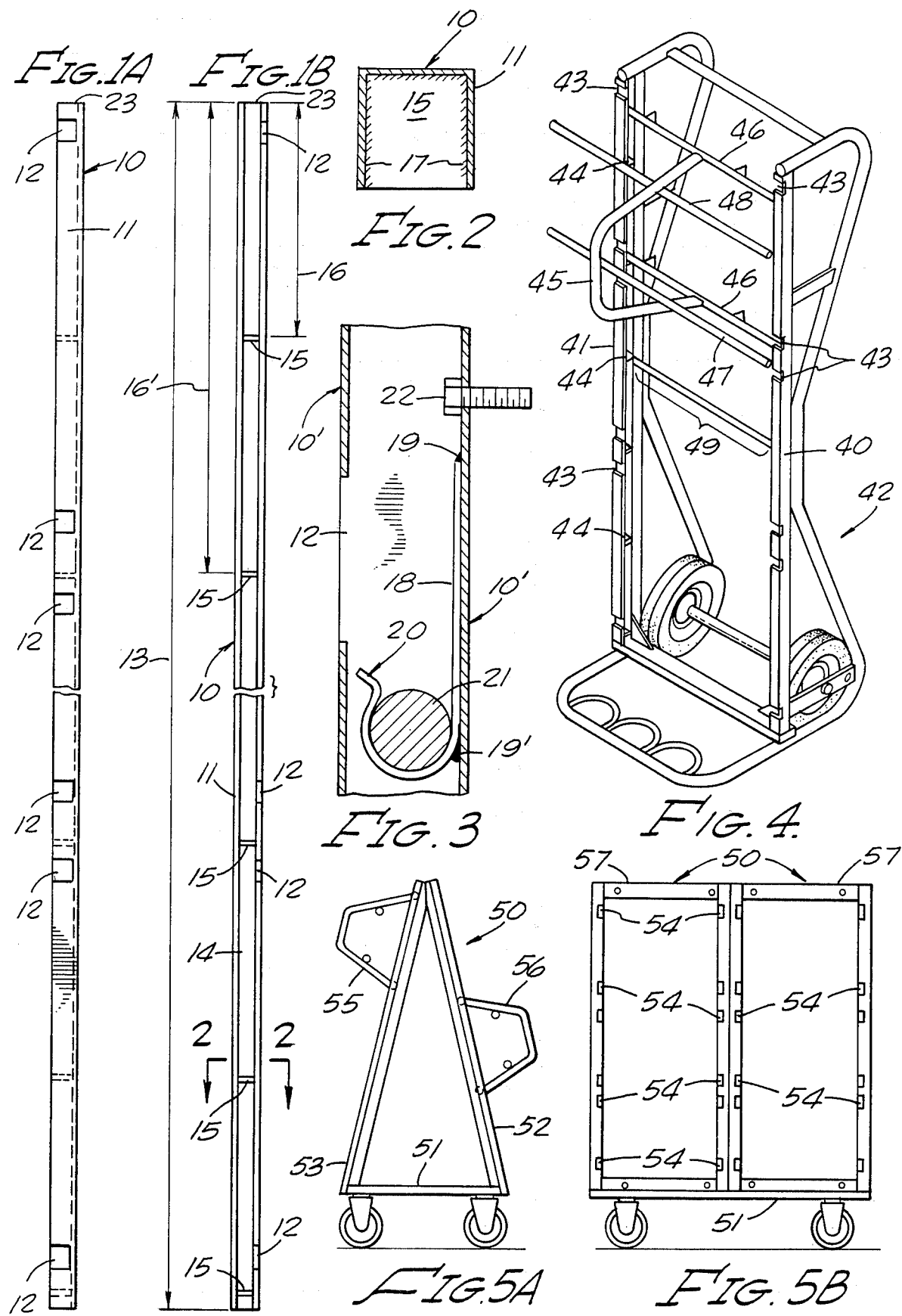

U-CHANNEL STORAGE SYSTEM

BACKGROUND OF THE INVENTION

The U-channel storage system of this invention is classified in classes 280/47.24, 47.19 and 242/54, 86.5, 129.

In U.S. Pat. No. 4,457,527 issued July 3, 1984, a utility cart having two wheels has a back plate mounted across the upright cart frame and side plate on the two sides. Shafts are disposed between the side plates on brackets secured to the side plates. The shafts can carry spools of wire.

McDonald in U.S. Pat. No. 4,391,422 issued July 5, 1983 discloses and claims a spool carrier having a pair of wheels forming a dolly. Parallel shafts are disposed and secured across a paired right angle frame iron, the angle irons being secured by end frame supports. The shafts are juxtaposed in short open U-channels secured on the paired angle iron, and held in openly disposed legs of the paired U-channel short saddle members. Spring lock pins are disposed through paired apertures in the short saddle members, to retain the shafts in a locked position. One or more reels of wire can be stored on each shaft until it is paid out in use.

Bank, in U.S. Pat. No. 3,937,414 issued Feb. 10, 1976 discloses and claims a wire reel dolly having a flat horizontal carriage with a pair of wheels at one end thereof. Multiple fixed shafts project normally from an underbed first plate of the carriage. A second horizontal overplate fits closely parallel to the first plate, and has multiple turntables journaled therein, supported by adaptively sized and supported bearings. The horizontal turntables support wire reels journaled on the fixed shafts of the first plate.

Devine, in U.S. Pat. No. 3,937,413 issued Feb. 10, 1976 discloses and claims a dual frame rocker trailer for cable reels. An upper and lower parallel supported frame for reels has U-channel short journal bearing brackets juxtally disposed across the upper frame, on which shafts or bars are disposed. The bars are secured in the U-channel brackets by pin indexing and securing.

Zimmer, in U.S. Pat. No. 3,856,230 issued Dec. 24, 1974, discloses and claims a cart for dispensing wire or like products wound on reels. Special shafts having end flanges fit into the aligned acutely angled slot pair of right angle iron side members secured on a wheeled dolly.

None of the above relative cited prior art present the inventive advance of this application. The prior art generally has excessive loose retaining pins for reel shafts, which can be lost. Shafts are also disclosed which require special machining for use in the prior art invention. Applicant does not have any loose retaining pins, or special machining of shafts.

SUMMARY OF THE INVENTION

A pair of U-shaped metal channels having paired equal lengths are disposed and secured a selected parallel distance apart. The pair of U-channels are secured with their channel bases oppositely disposed to the surface on which the channels are secured, secured by bolts, welding or screws and the like fastening means. The U-channels are alternatively secured to a flat wall, an upright standing dolly frame, a tradesman's utility truck, or the like convenient oppositely paired support means. Paired open slots formed in the paired adjacent channel sides are juxtaposed. The paired open slots may likewise be formed a selected distance apart, up and down the pair of U-channels, providing a multiplicity of juxtaposed paired open slots.

A short adapted and selected distance below each slot in an upright inner channel adjacent side there is permanently positioned in the U-channel, a channel stop sized and adapted to be permanently welded into and blocking the U-channel internal volume. The channel stop can be a simple flat plate or a spring steel hook filling the channel interior. Either channel stop can support a rod member, adaptively sized to fit into the channel open slots, and to be held on a flat plate stop, or held in the paired spring steel hooks. The rod members can hold reels of wires of selected sizes, or rolls of electrical conduit. The paired open slots can be adaptively disposed to hold wire caddies, having paired caddies two rod feet adaptively fitting into an adjacent pair of paired open slots. Likewise, pierced open network metal panels can be provided, having sizes adapted to be held by a pair of rod members adaptively sized to fit into a quadruplet set of open channel slots and stops. Tool boxes, test instruments, and storage boxes for useful selected parts can be secured to the network metal panels, or to a pair of rods above.

The paired U-channels with juxtally opposed slots and stops can be disposed on dollies, A-frames having wheel supports, and fixed walls, and form a U-channel storage system.

An important inventive advance of this storage invention is the absence of spring locking pins, other pins, and U-bolts which are required in other inventions to lock and secure the rod members in place in devices for carrying wire reels, conduit reels, or the like. No special machining of rod termini are required for operationally holding the rod members.

Included in the objects of this invention are:

To provide a U-channel storage system for wire reel, conduit reels, tool containers and instrumentation.

To provide a U-channel rod storage system for wire reels, conduit reels, and accessory containers which is free of loose locking spring pins, nut and bolt fasteners, and other retaining fittings which can be lost on using the storage system.

To provide a simple and mobile U-channel rod storage device which can be wheeled to the place of use on a construction site.

To provide a U-channel rod storage system which can be secured to a flat wall.

To provide a U-channel rod storage system which can be disposed on a dolly, a tradesman's utility truck, or as an A-frame secured on wheels.

To provide a simple and easily indexed U-channel rod storage system for product reels and their required tooling which is free of loose retaining pins, bolts and fittings which can be lost.

Other objects and advantages of this invention are taught in the following description and claims.

BRIEF DESCRIPTION OF THE DRAWINGS

The description of this invention is to be read in conjunction with the following drawings:

FIG. 1A is a partial front view of a slotted U-channel member of a pair of channel members of a selected length.

FIG. 1B is a confronting view of FIG. 1A, looking into the interior of the U-channel illustrating a set of support stops disposed below the slots.

FIG. 2 is a plan sectional view through 2—2 of FIG. 1B, illustrating a welded channel stop in a U-channel.

FIG. 3 is another side sectional view of another channel stop modification disposed below a channel slot, the spring stop holding a cross support shaft in position.

FIG. 4 is an upright perspective view of a typical dolly embodying a U-channel storage system secured on opposed sides of an upright dolly, and having a wire caddy disposed thereon.

FIG. 5A is a side elevational view of an A-frame formed by a pair of U-channel storage systems, affixed on a rolling flat truck dolly and having a pair of wire caddies disposed thereon.

FIG. 5B is a front view of the U-channel storage system of FIG. 5A illustrating two systems side by side adjacently.

DESCRIPTION OF THE PREFERRED EMBODIMENT OF THE INVENTION

Referring to FIG. 1A there is shown a view of one leg 11 of a U-channel 10 having multiple rectangular slots 12 cut in the outward shown leg of the U-channel at selected positions in the partially shown channel length 13. Referring to FIG. 1B, there is shown the same U-channel rotated around the length axis to show the inner channel 14 of 10 with stops 15 welded therein 10 at selected distances 16, 16' (lengths) below the channel top 23. The distances 16, 16' and the like slot distances below top 23 are selected and regulated to accommodate the differing diameters of loaded wire reels, ranging from 6¼, 8, 10½ and 11½ to 15 inches in diameter, when loaded on shafts disposed and secured in system slots 12, resting on stops 15, and forming a U-channel storage system. FIG. 2 shows the stop 15 welded in place inside channel 10, by the welds 17. FIG 3 shows another variation of a channel stop 18 secured by welds 19 and 19' to the inside of a U-channel 10', below a slot 12. The spring hook 20 of the stop 18 grips the round shaft 21. A lag screw 22 is disposed through channel 10', and screw 22 can fasten 10' to a wall.

In FIG. 4, the U-channel system pair of channels 40, 41 are illustrated as disposed and secured on a conventional upright wheeled dolly 42, the multiple slots 43 in 40 and 41 shown confrontingly disposed. The slots 43 have flat welded stops 44 disposed and secured a series of selected lengths below the slots 43, as detailed in the description above of FIGS. 1A and 1B.

A wire caddy 45 is also illustrated in FIG. 4 having two caddy feet shaft lengths 46 adapted in lengths to fit in securely in the slots 43 and be secured therein slots 43 on stops 44. The two caddy arms 47 and 48 can carry and secure at least four reels of wire on the arms, fastened on the arms by securing pins in the arms 47 and 48 termini (pins not shown).

FIGS. 5A and 5B illustrate in side view and frontal view respectively, the structure of a plural U-channel storage system 50, formed on a four wheel dolly. Four U-channel storage systems are secured together on a four wheel dolly in two A-frame structures 52 and 53 having multiple slots 54. The two A-frames are each secured by selected spaced members a selected distance apart at the top and bottom of each A-frame, as the multiple spaced members 57.

The wire caddies 45, 55, 56 can have caddy paired feet adaptively sized in length and diameter to fit into and be secured in a U-channel storage system secured to a flat wall by lag screw 22 or the like screws. The caddies secured in the U-channel storage system can support and secure reels of wire, reels of cable conduit, or the like.

The shafts 21 and the like are sized in diameter and in shaft length to fit into the slots 12, and the like, and also to be secured by the spring hook 20. The shaft length 49 of FIG. 4 illustrates the assembled U-channel storage systems 40, 41.

The U-channel can be formed by the conventional steel mill processes, or may be formed by welding together lengthwise two right angle iron lengths.

Many modifications in the U-channel storage system can be made in the light of my teachings. It is understood that within the scope of the claims, the invention can be practiced otherwise than as described.

I claim:

1. A wire reel storage system comprising:
   a discrete pair of opposed U-shaped metal channels, each U-shaped channel having a channel base, front and rear channel legs and being of equal length, said pair of U-shaped channels having their channel bases outwardly disposed and secured on support means, said pair of U-shaped channels having multiple open slots formed in the front channel legs at oppositely corresponding positions, and disposed at selected equally spaced distances apart on each channel.
   multiple supporting stops securely disposed at selected distances below each slot in said U-shaped channels, each stop being located at oppositely corresponding positions in said U-shaped channels to provide a plurality of support means,
   at least one rod shaft means disposed between a pair oppositely corresponding slots in said U-shaped channels, said rod shaft means disposed on said paired supporting stops thereby providing support for at least one or more reels of wire and cable conduit,
   and
   a wire reel caddy means having a pair of rod feet disposed parallel to said rod shaft means, each of said pair of rod feet having selected lengths and parallel spacing adapting them to engage said multiple oppositely corresponding slots and stops of said opposed U-shaped channels.

2. In the wire reel storage system set forth in claim 1, the further modification wherein,
   each stop is a flat metal plate welded in and completely across the U-shaped channel volume.

3. In the wire reel storage system set forth in claim 1, the further modification wherein,
   each stop is a spring steel hook disposed in the U-shaped channel, said hook disposed to secure a rod member pressed into said hook, said hook welded in said U-shaped channel.

4. A wire reel storage system comprising: an A-shaped support means comprising two inclined support legs mutually connected at an apex by top channel members, each support leg comprising two parallel pairs of U-shaped channels, each U-shaped channel having a base and front and rear legs extending therefrom defining an opening therebetween, said openings of said U-shaped channels of each pair facing each other, each U-shaped channel of each pair having a plurality of open slots formed in the front leg thereof at oppositely corresponding locations and at selected equal distances in each front leg to provide, pairs of said slots, each U-shaped channel of each pair further having a plurality of supporting stops, each stop being securely disposed at selected distances below each slot in said U-shaped channels to provide paired support means,
at least one rod shaft means engaging at least one pair of said oppositely corresponding slots and stops thereby providing shaft means for supporting one or more reels of wire or cable conduit, and a wire reel caddy means having an opposed pair of rod feet disposed parallel to said rod shaft means, said pair of feet having selected lengths and parallel spacing adapting it to engage said pairs of said oppositely corresponding slots and stops of each pair of U-shaped channels.

* * * * *